(12) United States Patent
Reynolds et al.

(10) Patent No.: US 6,450,479 B1
(45) Date of Patent: Sep. 17, 2002

(54) INTERCHANGEABLE SOCKET SET FOR BELOW GROUND VALVES

(76) Inventors: Stuart A. Reynolds, 800 Sequoia La., Vestal, NY (US) 13850; Earl B. Davis, 383 Billsboro Rd., Geneva, NY (US) 14456

( * ) Notice: Subject to any disclaimer, the term of this patent is extended or adjusted under 35 U.S.C. 154(b) by 0 days.

(21) Appl. No.: 09/709,587

(22) Filed: Nov. 13, 2000

(51) Int. Cl.⁷ ................................................ F16K 31/60
(52) U.S. Cl. ...................................... 251/291; 251/292
(58) Field of Search ................................. 251/292, 291, 251/293; 137/272, 291

(56) References Cited

U.S. PATENT DOCUMENTS

| | | | | |
|---|---|---|---|---|
| 956,008 A | * | 4/1910 | Weitzel | 137/291 |
| 1,815,755 A | * | 7/1931 | Armstrong | 251/292 |
| 4,643,218 A | * | 2/1987 | Reed, Jr. | 251/291 X |
| 4,817,663 A | | 4/1989 | McAndrew | |
| 4,947,713 A | * | 8/1990 | Arnold | 81/121.1 |
| 5,115,833 A | * | 5/1992 | Himle | 251/292 X |
| 6,047,618 A | * | 4/2000 | Pieri | 81/121.1 |
| 6,095,174 A | * | 8/2000 | Miller | 137/272 X |

* cited by examiner

*Primary Examiner*—Kevin Lee (57) ABSTRACT

A valve opening and closing system for valves that are difficult to access has a universal torque rod to which one of a plurality of different sized socket wrench heads, forming a set, is individually attachable to the distal end thereof. Each socket wrench head of the set is color coded and may be stamped to indicate its specific size. The torque rod has a handle that forms a T-bar with the shank of the torque rod. An extension handle can be attached to increase handle length. An extension member can also be attached to the torque rod via its socket collar, to increase its length.

17 Claims, 7 Drawing Sheets

Figure 6

INTERCHANGEABLE SOCKET SET FOR BELOW GROUND VALVES

FIELD OF THE INVENTION

The present invention relates to below ground valves and, more particularly, to a set of interchangeable, T-bar socket wrench heads that attach to a universal T-bar unit for opening and closing below grade gas or water valves.

BACKGROUND OF THE INVENTION

For many years, underground valves have been serviced using an extensive set of T-bar, socket wrenches. These wrenches also have applicability to environments that are difficult to access but may not be underground, such as in the petroleum, brine, brewing and food processing industries. The utilities and organizations using these T-bar socket wrenches would be required to stock and transport an entire set of the T-bar wrench sizes, when servicing each valve site. This modus operandi is wasteful of storage space, and is not convenient for servicing the valves.

The complete set of T-bar units is heavy and cumbersome. It is thus expensive to outfit each service truck. It is an interesting point of conjecture why someone did not invent or provide a better system for opening and closing these below grade valves, long before this time.

The present invention includes a set of interchangeable socket heads that fits a universal T-bar unit. This system is similar to socket wrench heads used in mechanic socket wrench sets. The set contains socket heads, each of which respectively fits and attaches to a specific size of underground valve. The complete set of different sized wrench heads fits and attaches to a universal T-bar unit. The different socket wrenches are color coded to provide quick recognition of their specific size. The set provides a more convenient method of opening and closing below grade gas and water valves.

The universal T-bar unit of this invention is extendible, so that different lengths can be achieved. The extendibility is achieved in a number of ways. The handle can telescope in order to provide greater torque in opening or closing the valves. The length of the shank of the T-bar can be increased by snap-on inserts, in order to reach or access remotely situated valves.

Each socket wrench can be attached to the end of the shank of the T-bar through a reinforcing collar that is welded onto the lower distal end. It is also contemplated that each of the sockets comprises means for snap-fitting it to the end of the shank, for example by use of a biased detent pin.

The T-bar shank also comprises a limiting collar for accepting a slide hammer. The slide hammer rides upon an upper portion of the shank. It is used to forcibly fit the T-bar and socket into engagement with a valve head that may be rusted or earth-encrusted.

The upper distal end of an extension member for the T-bar shank can comprise a male coupler for attaching it to the socket attachment collar of the T-bar.

DISCUSSION OF RELATED ART

U.S. Pat. No. 4,817,663, issued to McAndrew on Apr. 04, 1989, for BALL OR PLUG VALVE STEM EXTENSION AND LOCK MECHANISM, discloses a fluid control valve stem extension comprising a rod member to extend the valve stem. The end of the rod member supports a torque wheel to turn the rod and, hence, open or close the fluid valve. The rod is permanently attached to the valve stem by means of a set screw.

SUMMARY OF THE INVENTION

In accordance with the present invention, there is provided a set of different sized socket wrenches for engaging with below ground gas and water valves. For purposes of this disclosure, the terms "below ground" and "underground" are meant to include any environment for which valves are difficult to access, such as but not limited to the petroleum, brine, brewing and food processing industries. Each of the socket wrenches is color coded in order to distinguish its specific size. Each socket wrench attaches to the lower distal end of a torque rod, which is topped with a handle, thus forming a T-bar configuration. Both the handle and shank of the T-bar are extendible. The shank comprises a limiting collar for a slide hammer that rides over the upper shank portion of the torque rod. The slide hammer is useful in engaging and fitting the socket end of the torque bar to rusted or earth encrusted valve stems.

It is an object of this invention to provide an improved apparatus for servicing below ground gas and water valves.

It is another object of the invention to provide a set of socket wrenches for attachment to a universal torque rod.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

The present invention features a valve opening and closing system for below grade gas and water valves. The system comprises a universal torque rod to which one of a plurality of different sized socket wrench heads, forming a set is individually attachable to the distal end thereof. The socket wrench heads of the set are each color coded to indicate its specific size. The torque rod has a handle that forms a T-bar with the shank of the torque rod. An extendible bar is inserted in the handle to increase its length. An extension member can be attached to the torque rod via its socket collar to increase its length.

Figure 1:
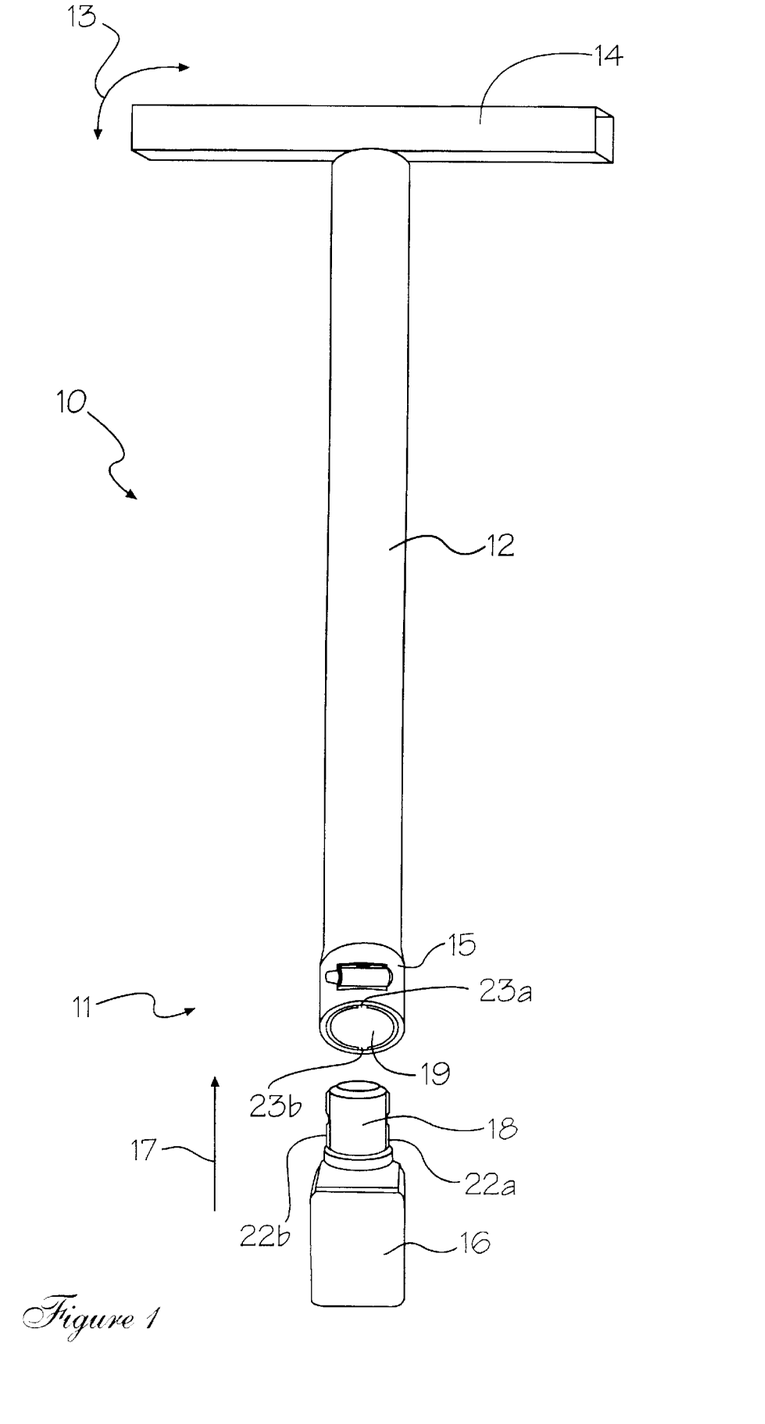
FIG. 1 illustrates a perspective, exploded view of the torque rod and the socket attachment collar for the apparatus of this invention.

Now referring to FIG. 1, an exploded, perspective view of the valve opening and closing apparatus 10 of this invention is illustrated. The apparatus 10 comprises a torque rod shank 12, to which a handle 14 is permanently affixed. An extendible handle, not shown in FIG. 1, is attached to handle 14; both are movable in either a clockwise or counter-clockwise direction (arrows 13), in order to apply a torque to torque rod shank 12.

Figure 1A:
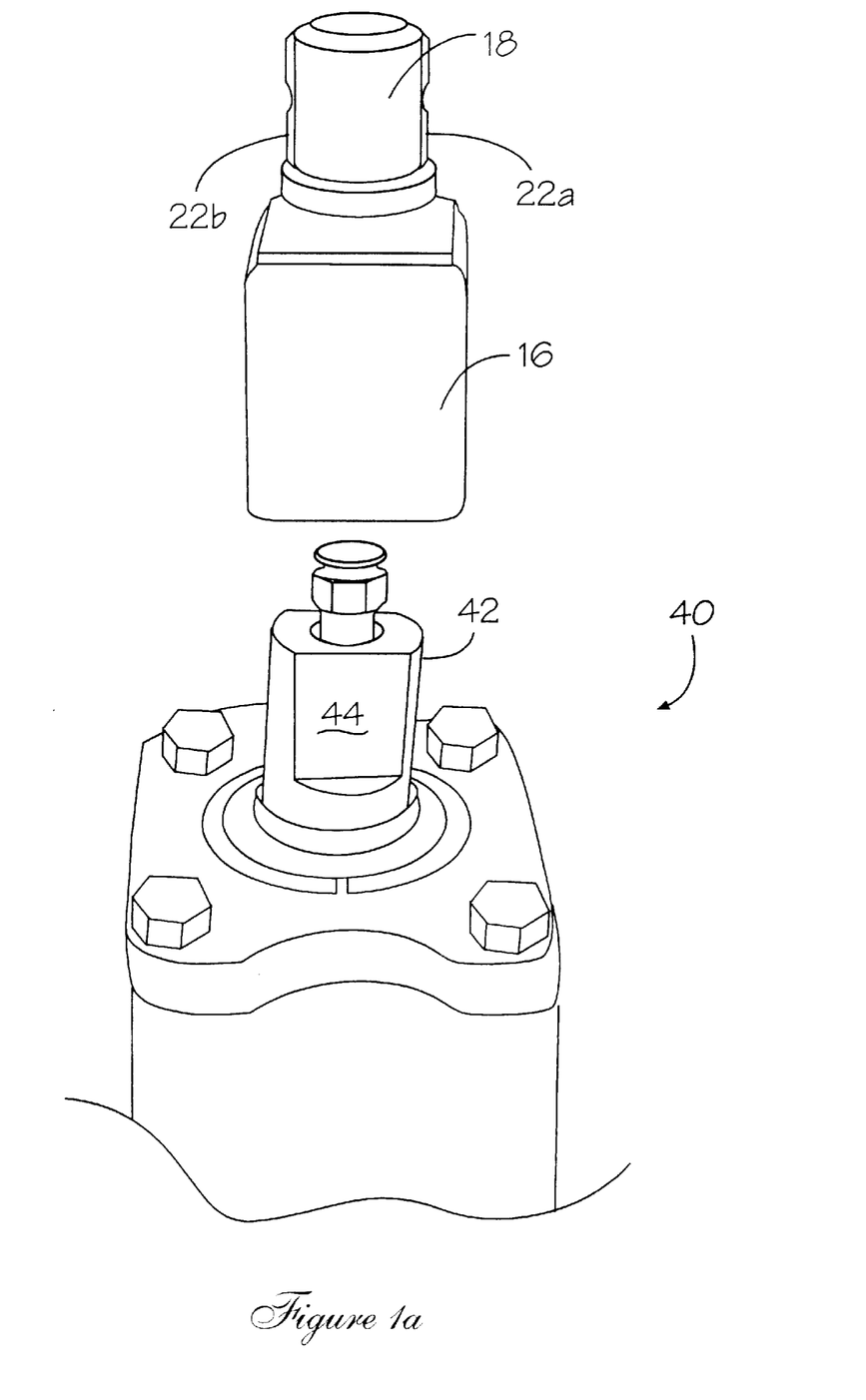
FIG. 1a depicts a perspective view of a socket juxtaposed with a valve to be opened or closed.

Referring now to FIG. 1a, valve socket head 16 is shown juxtaposed above a fixture 40 having a valve 42 and flat face 44, as is commonly encountered in the field. When the opening of socket head 16 is placed over valve 42, apparatus 10 can open or close valve 42.

Figure 2:
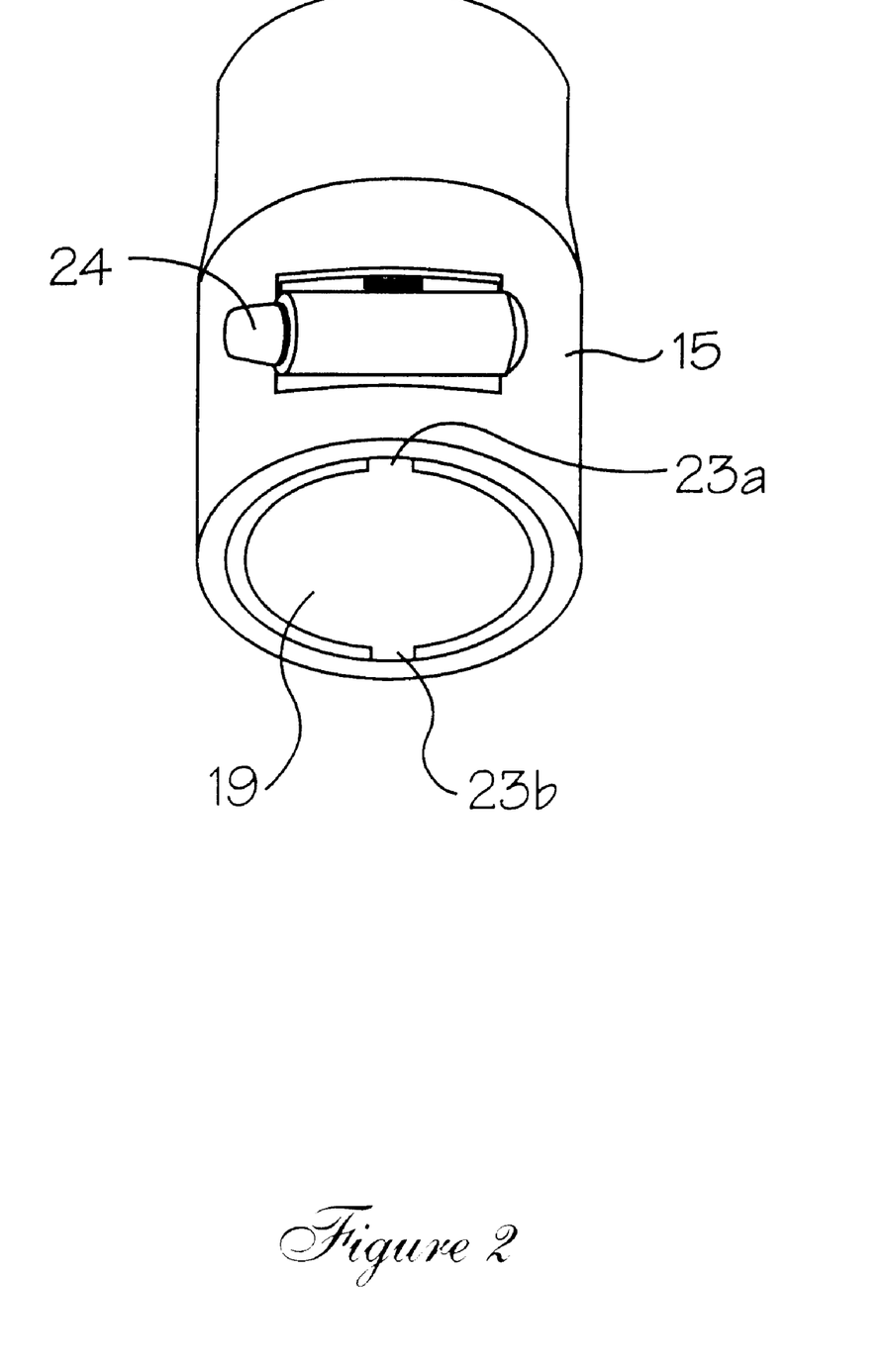
FIG. 2 depicts an enlarged, perspective view of the attachment collar shown in FIG. 1.
Figure 3:
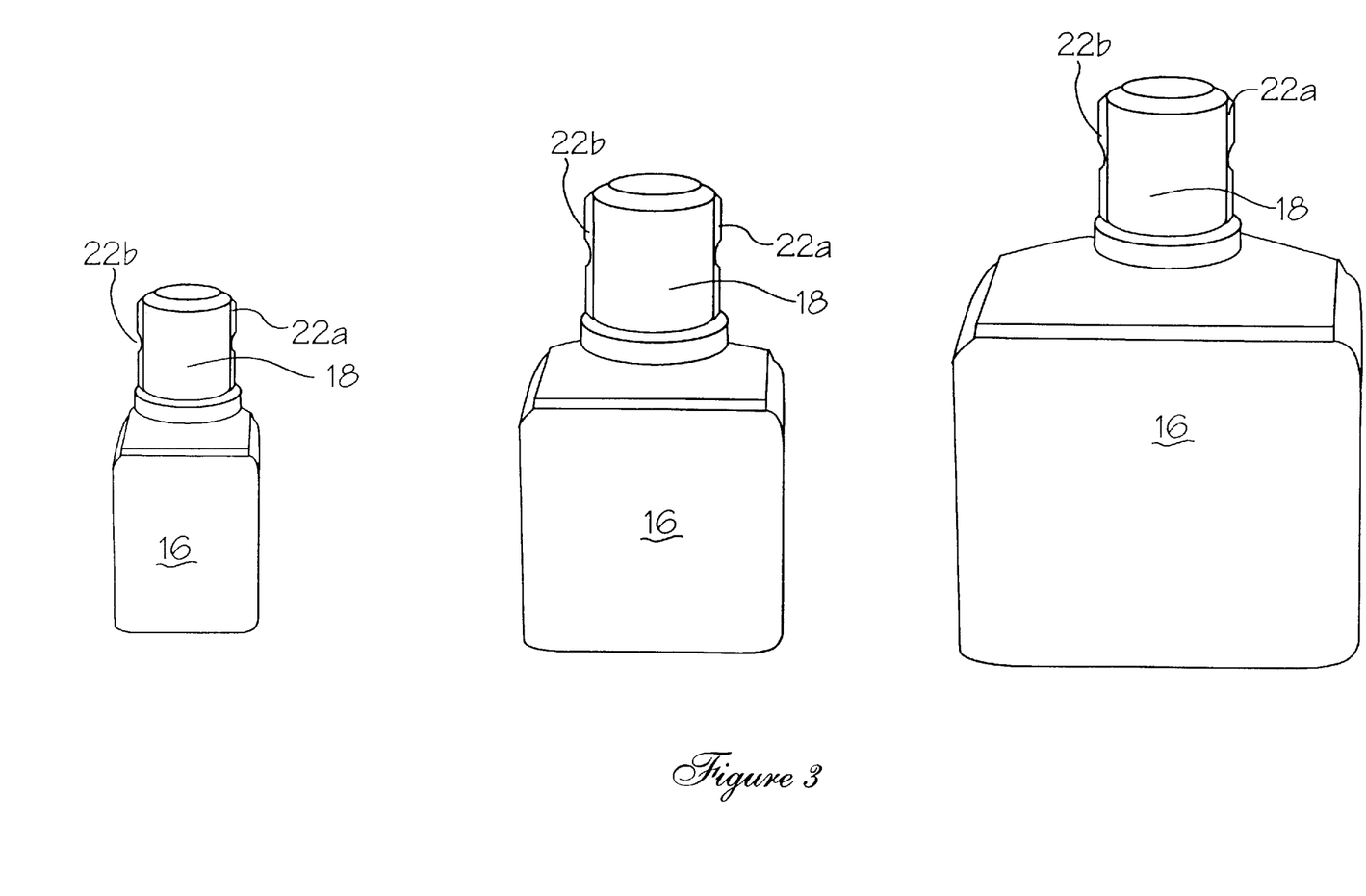
FIG. 3 shows a perspective view of a typical set of socket wrench heads for attachment to the collar of the torque rod depicted in FIG. 1.

At the lower distal end 11 of the torque rod shank 12 is situated a socket attachment collar 15, shown in greater detail in the enlarged view depicted in FIG. 2. A typical valve socket head 16, which is part of a set of different sized heads shown in FIG. 3, is attachable to the attachment collar 15, as shown by arrow 17. The cylindrical barrel head 18 of the socket head 16 enters the opening 19 of the attachment collar 15, and secured therein by means of a biased detent button 24.

The barrel head 18 of each socket head 16 comprises two elongated keys 22a and 22b, respectively, which align the barrel head 16 with the collar 15, via respective keyways 23a and 23b, as shown in greater detail in FIGS. 2 and 3, respectively.

Referring again to FIG. 3, a set of different sized socket heads 16 is illustrated. Each socket head 16 is color coded and may be stamped for a specific size that fits a particular gas or water valve disposed below grade.

Figure 4:
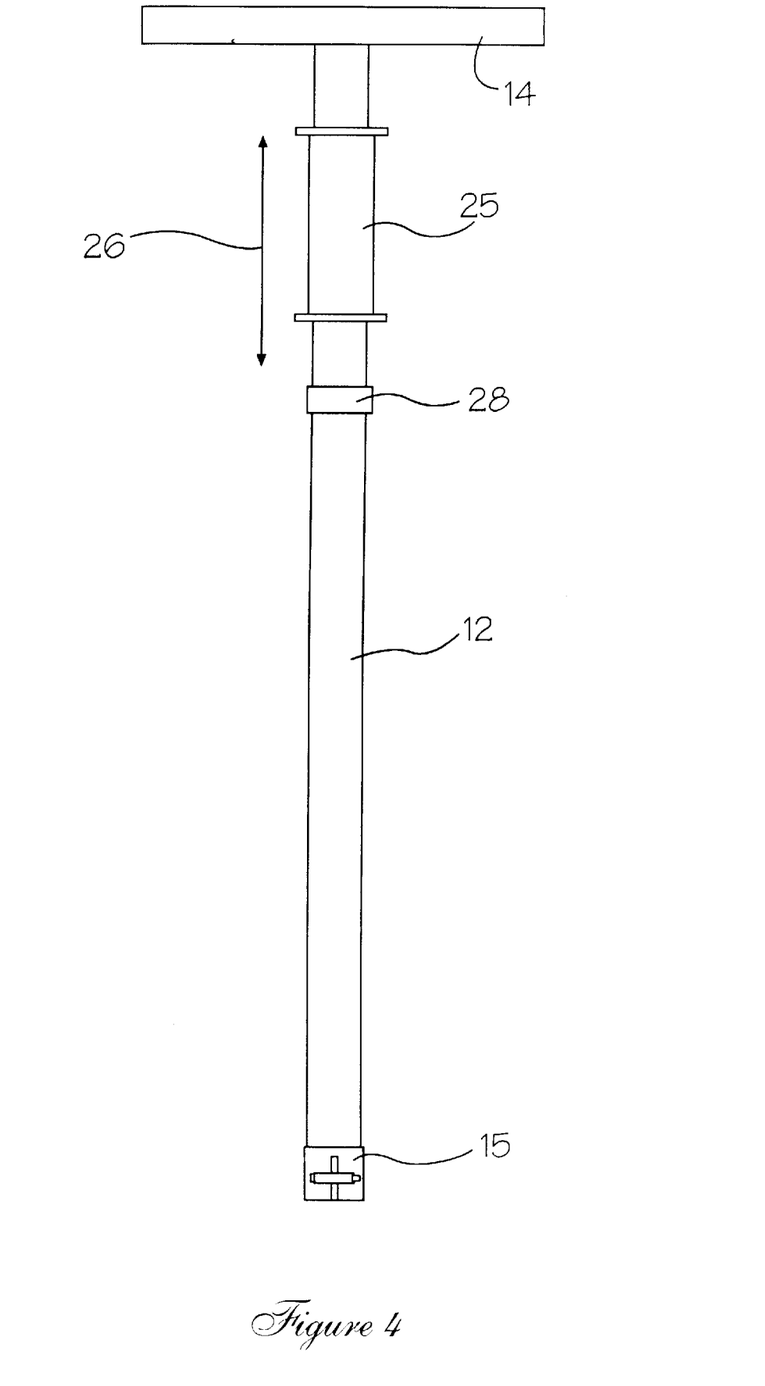
FIG. 4 illustrates a front view of the torque rod of FIG. 1, depicting a slide hammer and limit collar.

Referring to FIG. 4, the torque rod shank 12 is again shown fitted with the handle 14 and the socket attachment collar 15. In addition, this front view also shows a slide hammer 25 that slides up and down over the shank rod 12, as shown by arrows 26. A limit collar 28 engages the slide hammer 25, and transmits the force of the hammer 25 into the collar portion 15, below. The slide hammer 25 is used to force the socket head 16 into a gas or water valve (not shown) that may be rusted or earth encrusted.

Figure 5:
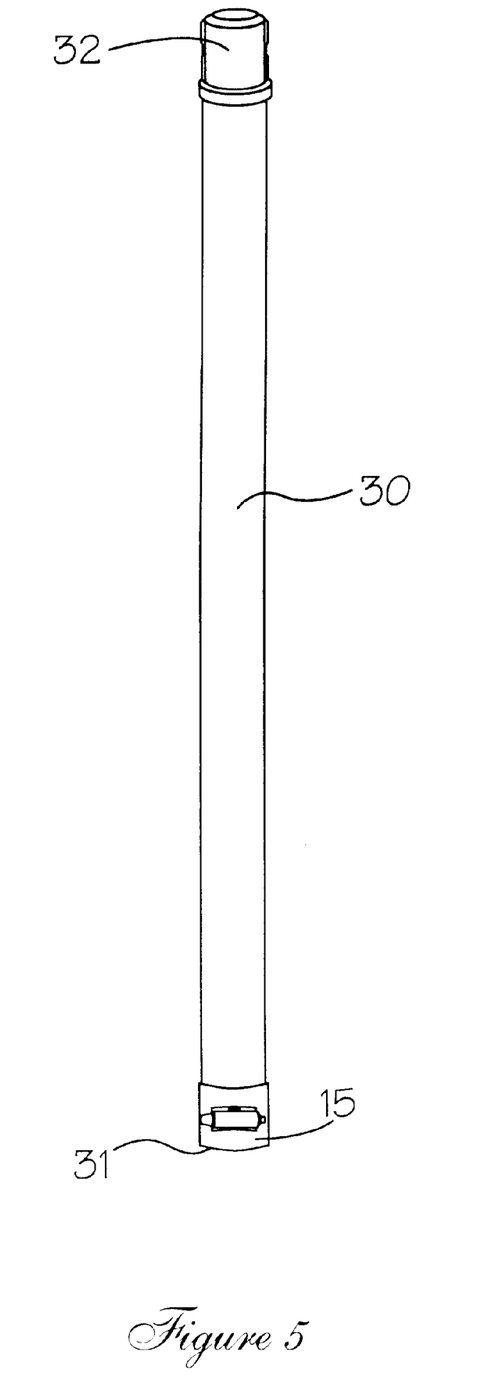
FIG. 5 shows an extension rod with male coupler for attachment to the torque rod of FIG. 1 via the socket collar, in order to expand the length thereof.

Referring to FIG. 5, an extension rod 30 is depicted. The extension rod 30 is attached to the torque rod 12 in order to increase the length thereof. The extension rod 30 comprises a male coupler 32, having a shape similar to that of the socket barrel head 18. The male coupler 32 is inserted into the hole portion 19 of the socket collar 15, in similar manner as a socket head 16. The lower end 31 of the extension rod 30 comprises an attachment collar 15 for receiving a socket head 16.

The apparatus 10 of this invention can be fitted with various lengths of extension rods. The handle 14, shown in FIGS. 1 and 4, can be configured with the extendible handle to telescope in order to increase the torque being exerted upon torque rod 12.

Figure 6:
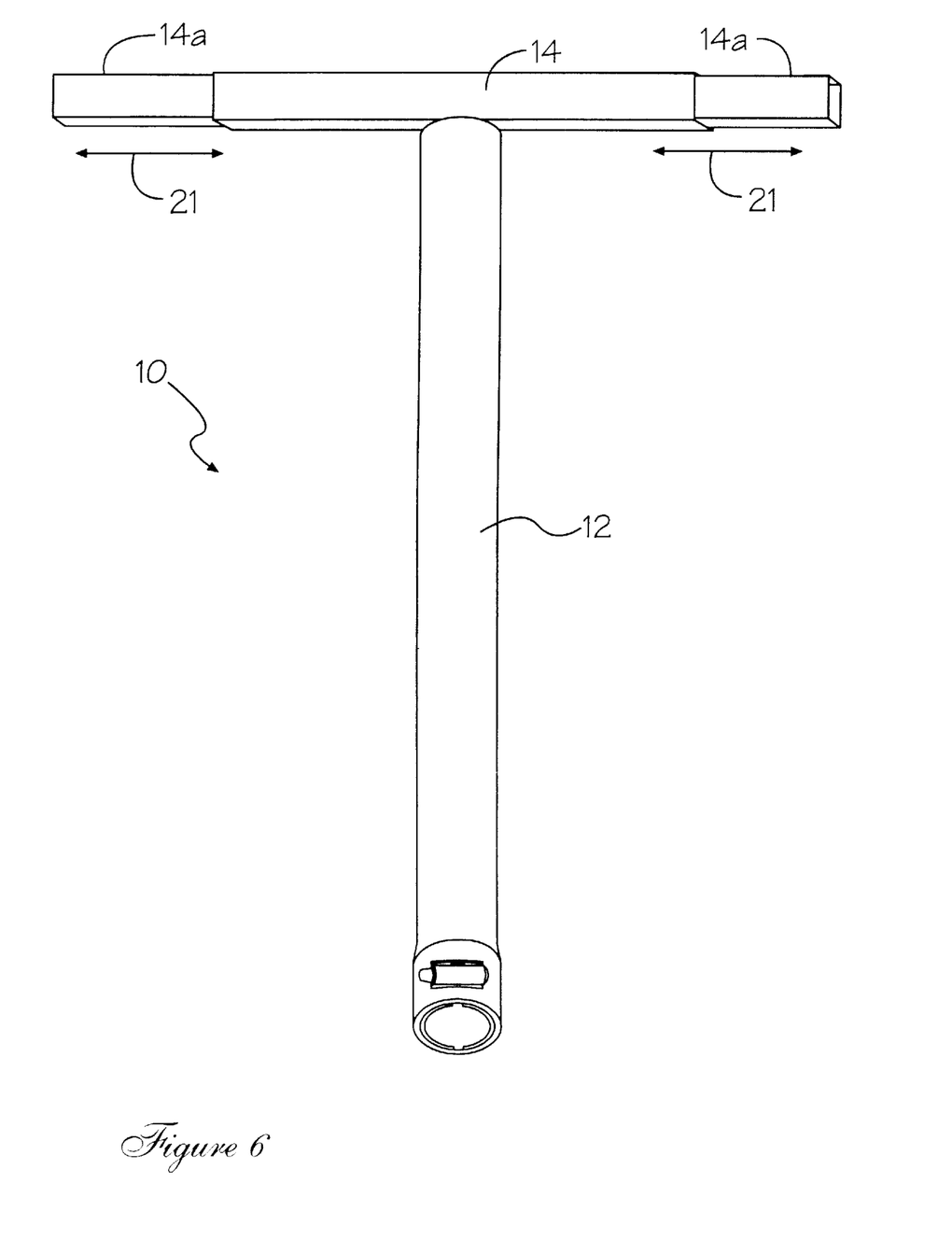
FIG. 6 shows an extendible handle that can be engaged with affixed T-bar handle of the torque rod of FIG. 1.

Referring now to FIG. 6, affixed T-bar handle 14 is hollow and receives an extendible handle 14a having outside dimensions that are smaller than the inner dimensions of handle 14. Extendible handle 14a is inserted into handle 14, when desired for greater torque, in directions shown by arrows 21. Extendible handle 14a itself can be any length and may also telescope within itself, as is known in the art.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. For example, although below ground applications were discussed herein, the scope of the invention includes other environments for which valves are difficult to access, regardless of whether such valves are below ground.

Having thus described the invention, what is desired to be protected by Letters Patent is presented in the subsequently appended claims.

What is claimed is:

1. A valve opening and closing apparatus, comprising:
    a torque rod for exerting a torque upon a valve, said torque rod having socket means for receiving one of a plurality of socket heads on a distal end thereof; and
    a set of different sized socket heads, each of which is respectively sized to fit and engage a particular sized valve, each socket head of said set of different sized socket heads having attachment means for mounting said socket head to the socket means of said torque rod, whereby different valves can be opened and closed by said valve opening and closing apparatus.

2. The valve opening and closing apparatus in accordance with claim 1, wherein each of said socket heads is color coded.

3. The valve opening and closing apparatus in accordance with claim 1, wherein each of said socket heads is stamped with its individual size.

4. The valve opening and closing apparatus in accordance with claim 1, wherein said torque rod has a permanently affixed handle for exerting a given torque upon a valve.

5. The valve opening and closing apparatus in accordance with claim 4, wherein said permanently affixed handle is hollow for receiving an extendible handle to provide greater torque.

6. The valve opening and closing apparatus in accordance with claim 1, wherein said socket heads each comprises a key for providing torque, and locking means for said torque rod.

7. The valve opening and closing apparatus in accordance with claim 1, further comprising extension means for attachment to said torque rod for increasing the length thereof.

8. The valve opening and closing apparatus in accordance with claim 7, wherein said extension means comprises coupling means for attaching to said torque rod via said socket means.

9. The valve opening and closing apparatus in accordance with claim 7, wherein said extension means comprises socket means on a distal end thereof, for receiving one of said plurality of socket heads.

10. A valve opening and closing apparatus for below ground gas and water valves, comprising:
    a torque rod for exerting a torque upon a valve, said torque rod having socket means for receiving one of a plurality of socket heads on a distal end thereof; and
    a set of different sized socket heads, each of which is respectively sized to fit and engage a particular sized valve, each socket head of said set of different sized socket heads having attachment means for mounting to the socket means of said torque rod, whereby different valves can be opened and closed by said valve opening and closing apparatus.

11. The valve opening and closing apparatus in accordance with claim 10, wherein each of said socket heads is color coded.

12. The valve opening and closing apparatus in accordance with claim 10, wherein each of said socket heads is stamped with its individual size.

13. The valve opening and closing apparatus in accordance with claim 10, wherein said torque rod has an extendible handle for exerting a given torque upon a valve.

14. The valve opening and closing apparatus in accordance with claim 10, wherein said socket heads each comprise a key for providing torque, and locking means for said torque rod.

15. The valve opening and closing apparatus in accordance with claim 10, further comprising extension means for attachment to said torque rod for increasing the length thereof.

16. The valve opening and closing apparatus in accordance with claim 10, wherein said extension means comprises coupling means for attaching to said torque rod via said socket means.

17. The valve opening and closing apparatus in accordance with claim 10, wherein said extension means comprises socket means on a distal end thereof, for receiving one of said plurality of socket heads.

* * * * *